United States Patent
So et al.

(10) Patent No.: US 11,575,880 B2
(45) Date of Patent: Feb. 7, 2023

(54) STEREOSCOPIC IMAGE DISPLAY APPARATUS WITH ALIGNMENT FUNCTION AND METHOD OF DISPLAYING STEREOSCOPIC IMAGE USING THE SAME

(71) Applicant: RealD Inc., Beverly Hills, CA (US)

(72) Inventors: Bong Jae So, Seoul (KR); Yong Kyu Kim, Seoul (KR); Young Suk Kim, Incheon (KR)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 17/546,349

(22) Filed: Dec. 9, 2021

(65) Prior Publication Data

US 2022/0174264 A1 Jun. 2, 2022

Related U.S. Application Data

(63) Continuation of application No. 15/945,633, filed on Apr. 4, 2018, now Pat. No. 11,223,819, which is a
(Continued)

(30) Foreign Application Priority Data

Apr. 6, 2015 (KR) ........................ 10-2015-0048228

(51) Int. Cl.
*H04N 13/32* (2018.01)
*H04N 13/337* (2018.01)
(Continued)

(52) U.S. Cl.
CPC ......... *H04N 13/327* (2018.05); *H04N 13/337* (2018.05); *H04N 13/363* (2018.05);
(Continued)

(58) Field of Classification Search
None
See application file for complete search history.

(56) References Cited

U.S. PATENT DOCUMENTS

| | | |
|---|---|---|
| 5,225,861 A | 7/1993 | Marks |
| 5,283,600 A | 2/1994 | Imai |
| | (Continued) | |

FOREIGN PATENT DOCUMENTS

| | | |
|---|---|---|
| CN | 101021674 A | 8/2007 |
| CN | 101398536 A | 4/2009 |
| | (Continued) | |

OTHER PUBLICATIONS

Australian Office Action in Appln. No. 2014218464 dated Mar. 19, 2015.
(Continued)

*Primary Examiner* — Bao-Luan Q Le
*Assistant Examiner* — Danell L Owens
(74) *Attorney, Agent, or Firm* — Penny L. Lowry

(57) ABSTRACT

A stereoscopic image display apparatus that is capable of being efficiently aligned using a remotely controlled alignment function and a method of displaying a stereoscopic image using the same are disclosed. The stereoscopic image display apparatus includes a polarizing beam splitter for spatially splitting image light emitted by a projector into at least one transmitted beam and at least one reflected beam based on polarized components, at least one modulator for adjusting the transmitted beam and the reflected beam such that the transmitted beam and the reflected beam have different polarization directions when a left image and a right image are projected by the transmitted beam and the reflected beam, an angle adjustment unit for adjusting the position on a screen on which the transmitted beam is projected in response to a first remote control signal, a
(Continued)

remote-control alignment type reflecting member for adjusting the path of the reflected beam in response to a second remote control signal such that the reflected beam overlaps the transmitted beam projected on the position on the screen adjusted in response to the first remote control signal in order to form a single image, and a remote controller remotely connected to the angle adjustment unit and the remote-control alignment type reflecting member for transmitting the first remote control signal and the second remote control signal to the angle adjustment unit and the remote-control alignment type reflecting member, respectively.

20 Claims, 14 Drawing Sheets

Related U.S. Application Data continuation of application No. 15/047,630, filed on Feb. 19, 2016, now Pat. No. 9,942,538.

(51) Int. Cl.
| | |
|---|---|
| H04N 13/39 | (2018.01) |
| H04N 13/363 | (2018.01) |
| H04N 21/422 | (2011.01) |
| H04N 13/327 | (2018.01) |
| H04N 13/398 | (2018.01) |
| H04N 21/45 | (2011.01) |
| H04N 21/475 | (2011.01) |

(52) U.S. Cl.
 CPC ..... *H04N 13/398* (2018.05); *H04N 21/42204* (2013.01); *H04N 21/42206* (2013.01); *H04N 21/4532* (2013.01); *H04N 21/4751* (2013.01)

(56) References Cited

U.S. PATENT DOCUMENTS

| | | | |
|---|---|---|---|
| 5,359,455 | A | 10/1994 | Oishi |
| 5,381,278 | A | 1/1995 | Shingaki et al. |
| 5,729,306 | A | 3/1998 | Miyake et al. |
| 5,772,299 | A | 6/1998 | Koo et al. |
| 5,982,538 | A | 11/1999 | Shikama et al. |
| 6,094,240 | A | 7/2000 | Hiyama et al. |
| 6,912,074 | B1 | 6/2005 | Son et al. |
| 7,559,653 | B2 | 7/2009 | Silverstein |
| 7,857,455 | B2 | 12/2010 | Cowan et al. |
| 8,134,109 | B2 | 3/2012 | Tang |
| 8,842,222 | B2 | 9/2014 | Iversen |
| 2008/0143965 | A1* | 6/2008 | Cowan ............... G03B 21/28 353/8 |
| 2010/0103379 | A1 | 4/2010 | Fiess |
| 2010/0141856 | A1 | 6/2010 | Schuck et al. |
| 2011/0053247 | A1 | 3/2011 | Baker et al. |
| 2011/0096295 | A1 | 4/2011 | Cowan et al. |
| 2011/0205496 | A1 | 8/2011 | Schuck et al. |
| 2012/0057134 | A1 | 3/2012 | Huang |
| 2013/0063701 | A1 | 3/2013 | Ouderkirk et al. |
| 2014/0104580 | A1 | 4/2014 | Tsai et al. |
| 2014/0293416 | A1* | 10/2014 | Ward ............... G02B 27/283 359/465 |
| 2015/0109539 | A1 | 4/2015 | Li et al. |

FOREIGN PATENT DOCUMENTS

| | | |
|---|---|---|
| CN | 101408675 B | 4/2009 |
| CN | 101726985 A | 6/2010 |
| CN | 103458208 A | 12/2013 |
| CN | 103529637 A | 1/2014 |
| CN | 203405635 U | 1/2014 |
| CN | 203705728 U | 7/2014 |
| CN | 104272172 A | 1/2015 |
| DE | 102008043153 A1 | 4/2010 |
| EP | 2469336 B1 | 6/2012 |
| EP | 2846180 A1 | 3/2015 |
| JP | H05203894 A | 8/1993 |
| JP | H05241103 A | 9/1993 |
| JP | 06317760 | 11/1994 |
| JP | h078511 A | 1/1995 |
| JP | 07146474 | 6/1995 |
| JP | H07146474 A | 6/1995 |
| JP | H07239473 A | 9/1995 |
| JP | H07333557 A | 12/1995 |
| JP | H09120047 A | 5/1997 |
| JP | 2010506199 A | 2/2010 |
| JP | 2010507130 A | 3/2010 |
| JP | 2010072138 A | 4/2010 |
| JP | 2010122589 A | 6/2010 |
| JP | 2010164802 A | 7/2010 |
| JP | 2010276710 A | 12/2010 |
| JP | 2011022530 A | 2/2011 |
| JP | 2013003327 A | 1/2013 |
| JP | 2013020199 A | 1/2013 |
| JP | 2014052930 A | 3/2014 |
| JP | 2015006199 A | 1/2015 |
| KR | 1020090089325 A | 8/2009 |
| KR | 1020090094224 A | 9/2009 |
| SU | 1182471 A1 | 9/1985 |
| WO | 2008048494 A2 | 4/2008 |
| WO | 2014163322 A1 | 10/2014 |
| WO | 2014191439 A1 | 12/2014 |

OTHER PUBLICATIONS

Canadian Office Action in Appln. No. 2,861,727 dated May 4, 2015.
Chinese Office Action in Appln. No. 201480000777.6 dated Feb. 29, 2016.
Chinese Office Action in Appln. No. 201480000777.6 dated Oct. 31, 2016 with English translation.
EP21183307.4 Extended European Search Report of European Patent Office dated Oct. 21, 2021.
European Search Report in Appln. No. 14742448.5 dated Apr. 14, 2015.
European Search Report in Appln. No. 14871124.5 dated Aug. 17, 2016.
International Search Report and Written Opinion of the International Searching Authority dated Jul. 7, 2015 for Application No. PCT/IB2014/002886.
International Search Report in International Application No. PCT/KR2014/002563, dated Jun. 23, 2014.
Masterimage3d: "Installation & Operation Manual; HORIZON3D & HORIZON3D S 55 HORIZON3D&HORIZON3D S Digital 3D Cinema System Installation & Operation Manual", Jul. 14, 2014, pp. 1-67, XP055276940.
Photography Measurement Experiment Course, Fei Deng et al., Wuhan University Press, the first edition in May 2012, pp. 47-48: 5.3.2 Stereoscopic Display System in Digital Era.
Russian Decision on Grant in Appln. No. 2014135220 dated Nov. 24, 2015.
The Basis and Application of Virtual Reality Technology, Xiaoqiang Hu, Beijing University of Posts and Telecommunications Press, the first edition in Feb. 2009, pp. 97-99: 3.1 Stereoscopic Display Technology.
Theory and Methods of Design System for Digitalized Railway Line Selection, Sirong Yi, Southwest Jiao Tong University Press, the first edition in Nov. 2011, pp. 285-286: 2 Polaroid.

\* cited by examiner

STEREOSCOPIC IMAGE DISPLAY APPARATUS WITH ALIGNMENT FUNCTION AND METHOD OF DISPLAYING STEREOSCOPIC IMAGE USING THE SAME

CROSS-REFERENCE TO RELATED APPLICATION

This application claims the benefit of Korean Patent Application No. 2015-0048228, filed on Apr. 6, 2015, which is hereby incorporated by reference in its entirety as if fully set forth herein.

BACKGROUND OF THE INVENTION

Field of the Invention

The present invention relates to a stereoscopic image display apparatus and a method of displaying a stereoscopic image using the same, and more particularly to a stereoscopic image display apparatus that is capable of being efficiently aligned using a remotely controlled alignment function and a method of displaying a stereoscopic image using the same.

Discussion of the Related Art

In general, a stereoscopic image (or a three-dimensional (3D) image) is realized by projecting different images to the two eyes of a user. For a stereoscopic image projected on a large-sized screen in a movie theater, mainly used is a polarization method in which a left image and a right image are transmitted using polarizing glasses that include left and right polarizing lenses having different polarizing directions which are perpendicular to each other. Images are captured using two cameras, the two captured images are converted using a polarizing means such that the polarizing directions of the images are perpendicular to each other, the images having polarizing directions perpendicular to each other are displayed on a screen, and a user views the images captured by the two cameras through his/her left and right eyes in a state in which the user wears the polarizing glasses, whereby a stereoscopic image is realized.

FIG. 1 is a view showing the structure of a conventional dual projector system for displaying a stereoscopic image.

In order to display a stereoscopic image using the polarization method as described above, the conventional dual projector system is configured such that one of the two-dimensional (2D) projectors 1 and 2 emits a left image, and the other of the two-dimensional (2D) projectors 1 and 2 emits a right image. These images pass through polarizing filters 3 and 4, polarizing directions of which are perpendicular to each other, and are then projected on a screen 5. A viewer views the left image and the right image, which overlap each other on the screen 5, through a left image lens 7 and a right image lens 8 of polarizing glasses 6 in a state in which the viewer wears the polarizing glasses 6, whereby a depth effect is obtained.

In the above method, different polarizations may be applied to the left image and the right image, irrespective of whether the polarization is linear polarization or circular polarization.

The conventional dual projector type stereoscopic image display system has been replaced by a single projector system, which is configured such that a projector alternately emits a left image and a right image.

FIG. 2 is a view illustrating a circular polarizing filter type single projector system.

As shown in FIG. 2, the single projector type stereoscopic image display system includes a projector 201 for alternately emitting a left image and a right image, a circular polarizing filter unit 202 including a left image polarizing filter and a right image polarizing filter, and a filter driving unit 203 for rotating the circular polarizing filter unit 202 in synchronization with the emission of the left image and the emission of the right image by the projector 201. In addition, as shown in FIG. 2, the single projector system further includes a synchronization unit 204 for synchronizing the emission of the left image with the emission of the right image and transmitting the acquired synchronization to the filter driving unit 203.

When stereoscopic image contents, in which left images and right images are sequentially stored, are input to the projector 201, the projector 201 continuously emits the stereoscopic image contents. As described above, the circular polarizing filter unit 202 includes the left image polarizing filter and the right image polarizing filter. The circular polarizing filter unit 202 is rotated such that the left image polarizing filter is located at an emission port of the projector 201 when each left image is emitted by the projector 201 and the right image polarizing filter is located at the emission port of the projector 201 when each right image is emitted by the projector 201.

In the single projector type stereoscopic image display system described above, however, brightness is reduced because the image light emitted by a single projector is split into left and right images.

In order to solve the problem with the conventional single projector system, i.e. to prevent the reduction of brightness, a stereoscopic image display apparatus that projects a transmitted beam and a reflected beam on a screen using a polarizing beam splitter, thereby improving brightness, has been proposed.

In the stereoscopic image display system using the polarizing beam splitter, to which the present invention will be applied, however, the quality of the stereoscopic image may be reduced if the reflected beam is not correctly aligned with the transmitted beam. In addition, in a case in which the alignment of the reflected beam with the transmitted beam is performed near the stereoscopic image display apparatus, and a state of alignment is checked in front of the screen, work efficiency may be greatly reduced, in a large space such as a movie theater.

Furthermore, in a case in which the stereoscopic image display apparatus, to which the present invention is applied, is installed at a high position, e.g. on the ceiling, the manual work for aligning the reflected beam with the transmitted beam may be dangerous.

SUMMARY OF THE INVENTION

Accordingly, the present invention is directed to a stereoscopic image display apparatus with a remotely controlled alignment function and a method of displaying a stereoscopic image using the same that substantially obviate one or more problems due to limitations and disadvantages of the related art.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display apparatus includes a polarizing beam splitter for spatially splitting image light emitted by a projector into at least one transmitted beam and at least one reflected beam based on polarized components, at least one modulator for adjusting the transmitted beam and the reflected beam such that the transmitted beam and the reflected beam have different polarization directions when a left image and a right image are projected by the transmitted beam and the reflected beam, an angle adjustment unit for adjusting the position on a screen on which the transmitted beam is projected in response to a first remote control signal, a remote-control alignment type reflecting member for adjusting the path of the reflected beam in response to a second remote control signal such that the reflected beam overlaps the transmitted beam projected on the position on the screen adjusted in response to the first remote control signal in order to form a single image, and a remote controller remotely connected to the angle adjustment unit and the remote-control alignment type reflecting member for transmitting the first remote control signal and the second remote control signal to the angle adjustment unit and the remote-control alignment type reflecting member, respectively.

The remote-control alignment type reflecting member may include a reflecting member for reflecting the reflected beam toward the screen and a motor for adjusting the direction of the reflecting member upward and downward and leftward and rightward in response to the second remote control signal.

The angle adjustment unit may include a motor for adjusting the upward and downward angle of a main body, comprising the polarizing beam splitter, the modulator, and the remote-control alignment type reflecting member, of the stereoscopic image display apparatus in response to the first remote control signal.

The stereoscopic image display apparatus may further include a driving unit connected to the motor of the angle adjustment unit and the motor of the remote-control alignment type reflecting member for driving the motor of the angle adjustment unit and the motor of the remote-control alignment type reflecting member in response to the first remote control signal and the second remote control signal, respectively.

The reflected beam may include a first reflected beam that is reflected upward and a second reflected beam that is reflected downward, the first reflected beam and the second reflected beam being image-split from the image light emitted by the projector, and the remote-control alignment type reflecting member may include a first remote-control alignment type reflecting member for adjusting the path of the first reflected beam and a second remote-control alignment type reflecting member for adjusting the path of the second reflected beam.

The first remote-control alignment type reflecting member may adjust the first reflected beam in response to the second remote control signal such that the first reflected beam overlaps the transmitted beam projected on the position on the screen adjusted in response to the first remote control signal within a first part in order to form a single image, and the second remote-control alignment type reflecting member adjusts the second reflected beam in response to the second remote control signal such that the second reflected beam overlaps the transmitted beam projected on the position on the screen adjusted in response to the first remote control signal within a second part in order to form a single image. At this time, the first part and the second part may be coupled to each other on the screen in order to forma single image. At this time, the second remote control signal may control the first reflected beam and the second reflected beam, image-split from the image light, to be image-coupled to each other on the screen.

The stereoscopic image display apparatus may further include a camera for checking a state of alignment of the reflected beam with the transmitted beam in order to form a single image, obtained as the result of the reflected beam being aligned with the transmitted beam, on the screen. In this case, the remote controller may be configured to transmit at least one selected from between the first remote control signal and the second remote control signal based on an alignment state checking signal received from the camera. In addition, the remote controller may include a first control unit for controlling the start or end of an operation of transmitting at least one selected from between the first remote control signal and the second remote control signal based on the alignment state checking signal and a second control unit for controlling the operation of transmitting at least one selected from between the first remote control signal and the second remote control signal based on a workers determination.

The remote controller may be installed in a mobile user device in a form of software. However, the present invention is not limited thereto.

In another aspect of the present invention, a method of displaying a stereoscopic image includes spatially splitting image light err emitted by a projector into at least one transmitted beam and at least one reflected beam based on polarized components, adjusting the transmitted beam and the reflected beam such that the transmitted beam and the reflected beam have different polarization directions when a left image and a right image are projected by the transmitted beam and the reflected beam, adjusting the position on a screen on which the transmitted beam is projected in response to a first remote control signal, adjusting the path of the reflected beam in response to a second remote control signal such that the reflected beam overlaps the transmitted beam projected on the position on the screen adjusted in response to the first remote control signal, thereby forming a single image.

The step of spatially splitting the image light may include reflecting a first reflected beam upward and reflecting a second reflected beam downward, the first reflected beam and the second reflected beam being image-split from the image light emitted by the projector.

The step of forming the single image may include adjusting the first reflected beam in response to the second remote control signal such that the first reflected beam overlaps the transmitted beam projected on the position on the screen adjusted in response to the first remote control signal within a first part in order to form a single image, and adjusting the second reflected beam in response to the second remote control signal such that the second reflected beam overlaps the transmitted beam projected on the position on the screen adjusted in response to the first emote control signal within a second part in order to form a single image, the first part and the second part being coupled to each other on the screen in order to form a single image.

The second remote control signal may control the first reflected beam and the second reflected beam, image-split from the image light, to be coupled to each other on the screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out.

The following detailed description includes detailed matters to provide full understanding of the present invention. However, it will be apparent to those skilled in the art that the present invention can be carried out without the detailed matters. In some cases, in order to prevent the concept of the present invention from being ambiguous, structures and apparatuses of the known art will be omitted, or will be shown in the form of a block diagram based on the main functions of each structure and apparatus.

As previously described, the present invention relates to a stereoscopic image display apparatus that is capable of being efficiently aligned using a remotely controlled alignment function and a method of displaying a stereoscopic image using the same. First, a description will be given of a stereoscopic image display apparatus using a polarizing beam splitter to which the present invention is applicable.

Figure 1:
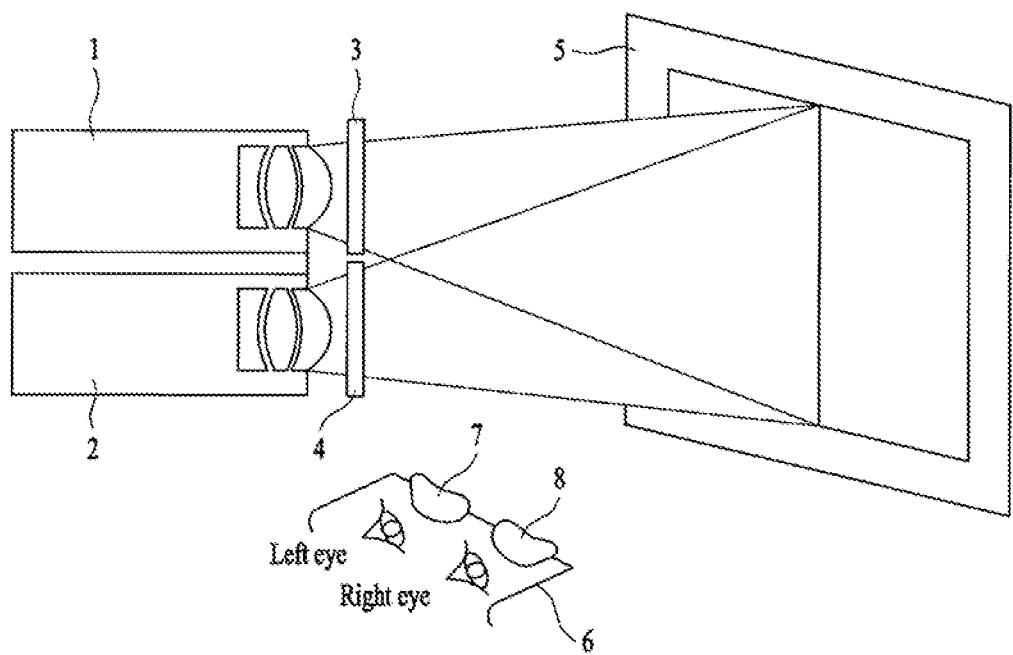
FIG. 1 is a view showing the structure of a conventional dual projector system for displaying a stereoscopic image.
Figure 2:
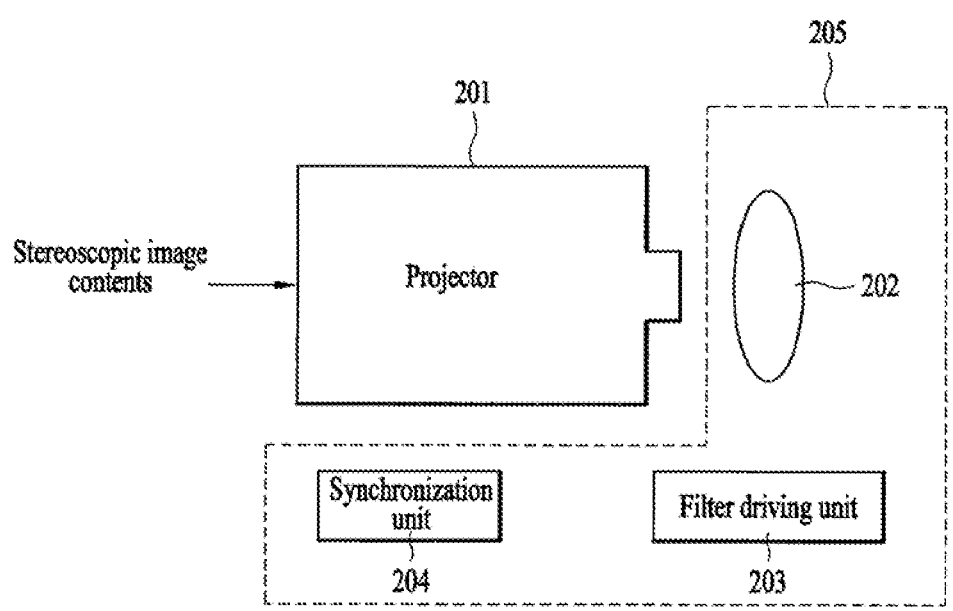
FIG. 2 is a view illustrating a circular polarizing filter type single projector system.
Figure 3:
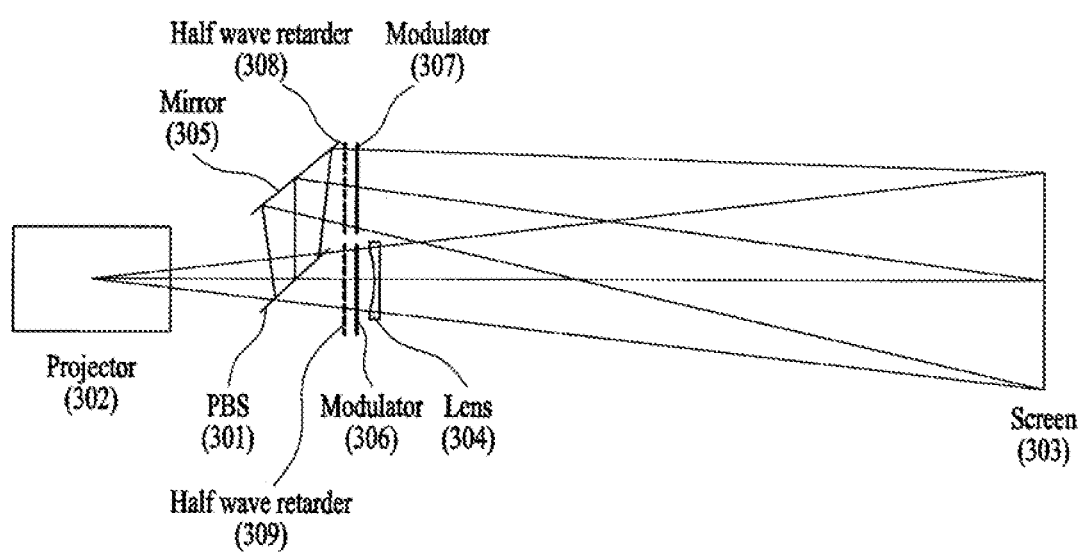
FIG. 3 is a view illustrating a stereoscopic image display apparatus, the brightness of which is improved using a polarizing beam splitter.

FIG. 3 is a view illustrating an example of a stereoscopic image display apparatus using a polarizing beam splitter to which the present invention is applicable.

In the stereoscopic image display apparatus shown in FIG. 3, light emitted by a projector 302 is split into two beams using a polarizing beam splitter (PBS) 301, the split beams are processed, and the processed beams are combined with each other on a screen 303 in order to improve brightness.

Specifically, image light emitted by the projector 302 is split into two beams having different polarized components by the polarizing beam splitter 301. That is, an S-polarized beam is reflected by the polarizing beam splitter 301, and a P-polarized beam transmitted through the polarizing beam splitter 301. The transmitted P-polarized beam is enlarged by a lens 304, and is then projected on the screen 303. On the other hand, the reflected S-polarized beam is reflected by a reflecting member 305, such as a mirror, and is then projected on the screen 303. The two transmitted and reflected beams are converted into left and right circular polarized beams by modulators 306 and 307.

Meanwhile, the two transmitted and reflected beams have different polarized components. In order to display a stereoscopic image, therefore, it is necessary to convert the two transmitted and reflected beams such that the two transmitted and reflected beams have the same polarization direction at the same time. To this end, a half wave retarder 308 located on a reflected beam path, which extends through the modulator 307, is used, and a half wave retarder 309 located on a transmitted beam path, which extends through the modulator 306, is not used, such that the image beams have the same linearly polarized beam component (e.g. the P-polarized component) before passing through the modulators 307 and 306, and the image beams become circularly polarized beams having the same direction or, according to circumstances, linearly polarized beams having the same direction after passing through the modulators 307 and 306.

On the other hand, the half wave retarder 308 located on the reflected beam path, which extends through the modulator 307, is not used, and the half wave retarder 309 located on the transmitted beam path, which extends through the modulator 306, is used, such that the image beams have the S-polarized component before passing through the modulators 307 and 306, and the image beams become circularly polarized beams having the same direction or, according to circumstances, linearly polarized beams having the same direction after passing through the modulators 307 and 306.

Figure 4:
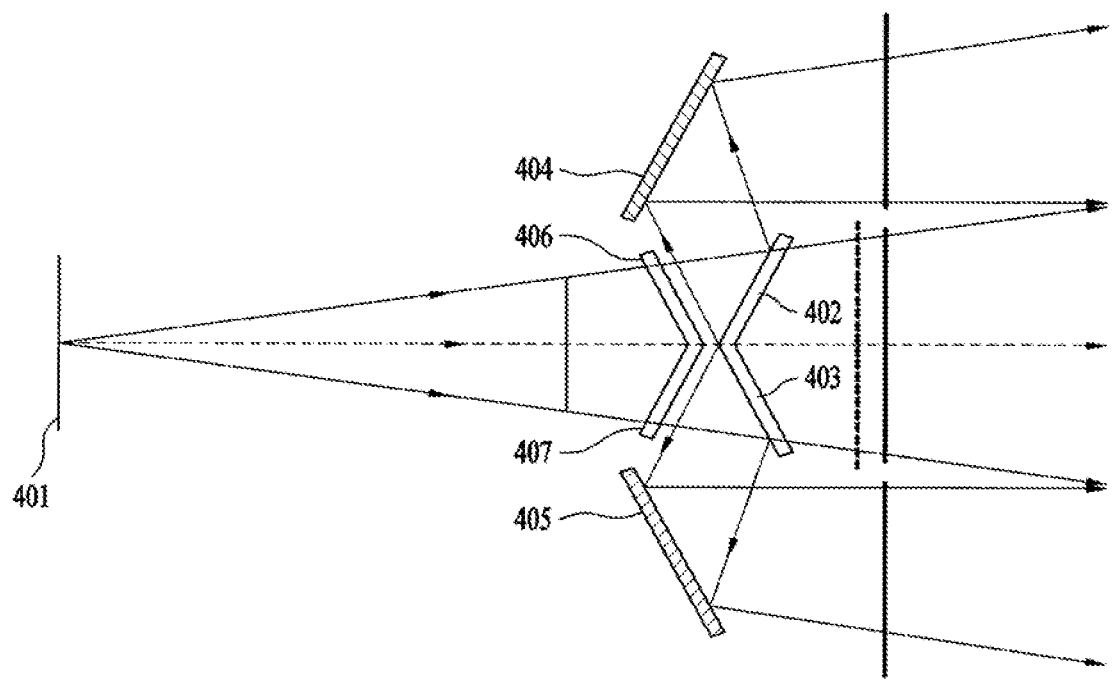
FIG. 4 is a view illustrating the operation of a modulator of a high-brightness stereoscopic image display apparatus.

FIG. 4 is a view illustrating another example of a stereoscopic image display apparatus using polarizing beam splitters to which the present invention is applicable. Specifically, the stereoscopic image display apparatus shown in FIG. 4 is configured such that image light is split into three beams by the polarizing beam splitters.

Referring to FIG. 4, image light emitted by a projector 401 may be split into a first image beam, which is transmitted through polarizing beam splitters 402 and 403, a second image beam, which is reflected by the polarizing beam splitter 402 and is subsequently reflected by a reflecting member 404, and a third image beam, which is reflected by the polarizing beam splitter 403 and is subsequently reflected by a reflecting member 405, The stereoscopic image display apparatus shown in FIG. 4 is characterized in that image light is split into one transmitted beam and two reflected beans based on polarized components thereof, and the two reflected beams are image-split from the image light. Therefore, the two reflected beams may be projected on a screen as a single image.

In the embodiment shown in FIG. 4, the polarizing beam splitters 402 and 403 are disposed such that a predetermined angle is defined between the polarizing beam splitters 402 and 403. In addition, the stereoscopic image display apparatus her includes refracting members 406 and 407 for preventing the image light from being lost when the image light is incident on the connection between the polarizing beam sputters 402 and 403.

Meanwhile, the polarizing beam splitters 402 and 403 shown in FIG. 4 may be configured to have a prism shape consideration of the difference between a transmitted beam path and a reflected beam path. Of course, the polarizing beam splitters 402 and 403 may be configured to have various shapes.

Hereinafter, a description will be given of a method of efficiently aligning the reflected beams with the transmitted beam under remote-control in the stereoscopic image display apparatus using the polarizing beam splitters as described above.

Figure 5:
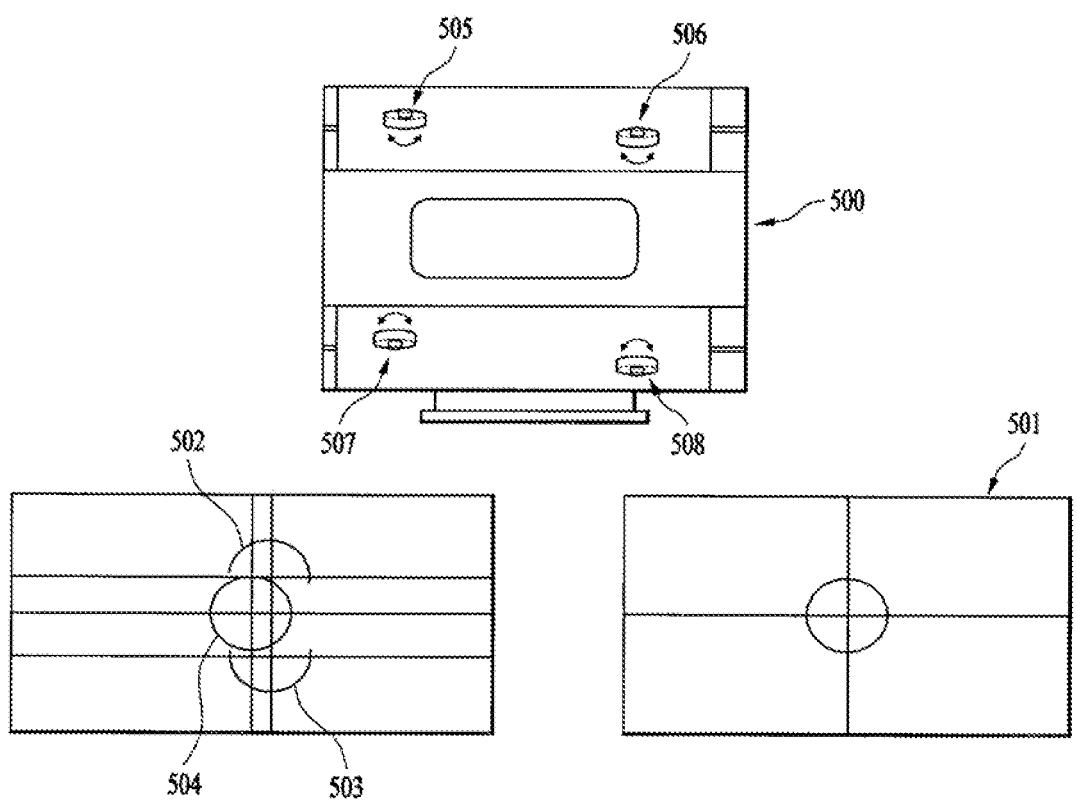
FIG. 5 is a view illustrating an example of a method of aligning a transmitted beam and reflected beams on a screen.

FIG. 5 is a view illustrating an example of a method of aligning reflected beams with a transmitted beam on a screen.

In this example, it is assumed that a stereoscopic image display apparatus is a system that uses three beams as previously described with reference to FIG. 4. In addition, in this example, it is assumed that a projector s a circular alignment image 501 in order to make it easily to align reflected beams with a transmitted beam. However, the shape of the alignment image is illustrative, and the alignment image may have various shapes, such as a cross shape. In a state in which the image is not aligned, as shown in the lower left part of FIG. 5, an upper reflected image 502 and a lower reflected image 503 may deviate from a transmitted beam 504.

Referring to FIG. 5, it is assumed that reference numerals 505 and 506 indicate leveling feet for controlling the alignment of an upper reflecting member in the triple beam system, and that reference numerals 507 and 508 indicate leveling feet for controlling the alignment of a lower reflecting member in the triple beam system.

In a case in which the reflected beams are not aligned with the transmitted beam as describe above, the leveling foot 505 for moving the upper reflecting member upward and downward and the leveling foot 506 for moving the upper reflecting member leftward and rightward may be manipulated such that a first part (e.g. an upper part) overlaps the transmitted beam on the screen in order to align the upper reflected image with the transmitted beam. In the same manner, the leveling foot 507 for moving the lower reflecting member upward and downward and the leveling foot 508 for moving the lower reflecting member leftward and rightward may be manipulated such that a second part (e.g. a lower part) overlaps the transmitted beam on the screen in order to align the lower reflected image with the transmitted beam. Here, it is assumed that the first part and the second part are coupled to each other on the screen to form a single image. As a result, the reflected beams may be the transmitted beam on the screen in a state in which the reflected beams are aligned with the transmitted beam.

In this specification, the term "coupling" indicates that split beams are coupled to each other on the screen to form a single image. For example, the screen image 502 of the upper reflected beam and the screen image 503 of the lower reflected beam may be coupled to each other on the screen to form a single circular image through the alignment process described above.

On the other hand, the term "overlapping" indicates that split beams overlap each other on the screen to increase brightness. For example, the screen image 504 of the transmitted beam may overlap the screen images 502 and 503 of the reflected beams to provide a high-brightness image through the alignment process described above. The above description is applied to the triple beam system described with reference to FIG. 4. Of course, the above description may also be applied to the double beam system described with reference to FIG. 3.

In a case in which a worker manually adjusts the leveling feet as described above, however, it is necessary for the worker to approach the screen, which is far ay from e stereoscopic image display apparatus, and to check a state of alignment obtained by adjusting the leveling feet. Alternatively, it is necessary for the worker to check the state of alignment using a telescope. After that, it is necessary for the worker to return to the stereoscopic image display apparatus and to perform a subsequent adjusting operation, which is troublesome and Inconvenient. Furthermore, in a case in which the stereoscopic image display apparatus is installed on a ceiling or wall, the manual alignment work may be dangerous.

Figure 6:
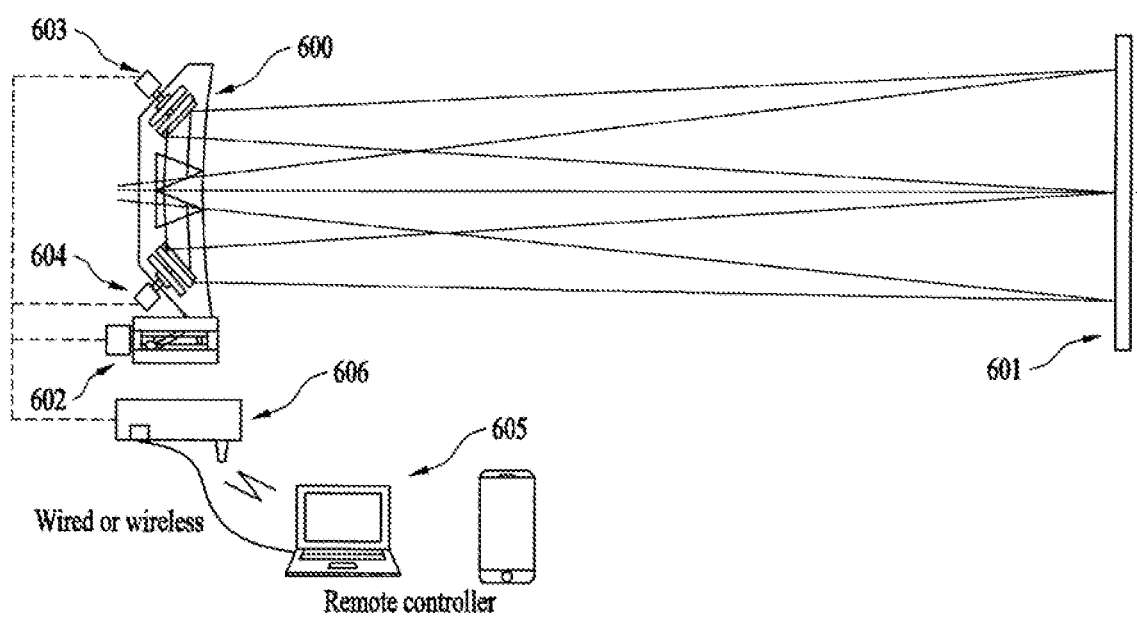
FIG. 6 is a view illustrating the concept of a stereoscopic image display apparatus according to an embodiment of the present invention.

FIG. 6 is a view illustrating the concept of a stereoscopic image display apparatus 600 according to an embodiment of the present invention.

The stereoscopic image display apparatus 600 shown in FIG. 6 is applied to the triple beam system described with reference to FIG. 4. However, the present invention is not limited thereto. For example, the stereoscopic image display apparatus shown in FIG. 6 may also be applied to the double beam system described with reference to FIG. 3.

The stereoscopic image display apparatus 600 shown in FIG. 6 is identical to the stereoscopic image display apparatus shown in FIG. 3 and the stereoscopic image display apparatus shown in FIG. 4 in that the stereoscopic image display apparatus 600 includes a polarizing beam splitter for spatially splitting image light, emitted by a projector, into at least one transmitted beam and at least one reflected beam based on polarized components and at least one modulator for adjusting the transmitted beam and the reflected beam such that the transmitted beam and the reflected beam have different polarization directions when a left image and a right image are projected by the transmitted beam and the reflected beam.

Meanwhile, the stereoscopic image display apparatus 600 according to the embodiment of the present invention shown in FIG. 6 may further include an angle adjustment unit 602 for adjusting the position on a screen 601 on which the transmitted beam is projected in response to a first remote control signal and remote-control alignment type reflecting members 603 and 604 for adjusting a path of the reflected beam response to a second remote control signal such that the reflected beam overlap the transmitted beam projected on the position on the screen 601 adjusted in response to the first remote control signal, in order to forma single image.

In addition, the stereoscopic image display apparatus 600 according to the embodiment of the present invention shown in FIG. 6 may further include a remote controller 605 remotely connected to the angle adjustment unit 602 and to the remote-control alignment type reflecting members 603 and 604 for transmitting the first remote control signal and the second remote control signal to the angle adjustment unit 602 and the remote-control alignment type reflecting members 603 and 604, respectively, in addition to the main body of the stereoscopic image display apparatus 600. As shown in FIG. 6, the remote controller 605 may be installed in a portable (or mobile) user device, such as a laptop computer or a cellular phone, in the form of an application or software. Alternatively, the remote controller 605 may be configured in the form of hardware.

Furthermore, the stereoscopic image display apparatus 600 may further include a driving unit 606 for driving motors configured to operate the angle adjustment unit 602 and the remote-control alignment type reflecting members 603 and 604.

In a case in which the stereoscopic image display apparatus 600 is a triple beam system, which splits image light emitted by a projector into a first reflected beam that is reflected upward and a second reflected beam that is reflected downward, as shown in FIG. 6, the remote-control alignment type reflecting members 603 and 604 may include a first remote-control alignment type reflecting member 603 for adjusting the path of the first reflected beam and a second remote-control alignment type reflecting member 604 for adjusting the path of the second reflected beam.

Figure 7:
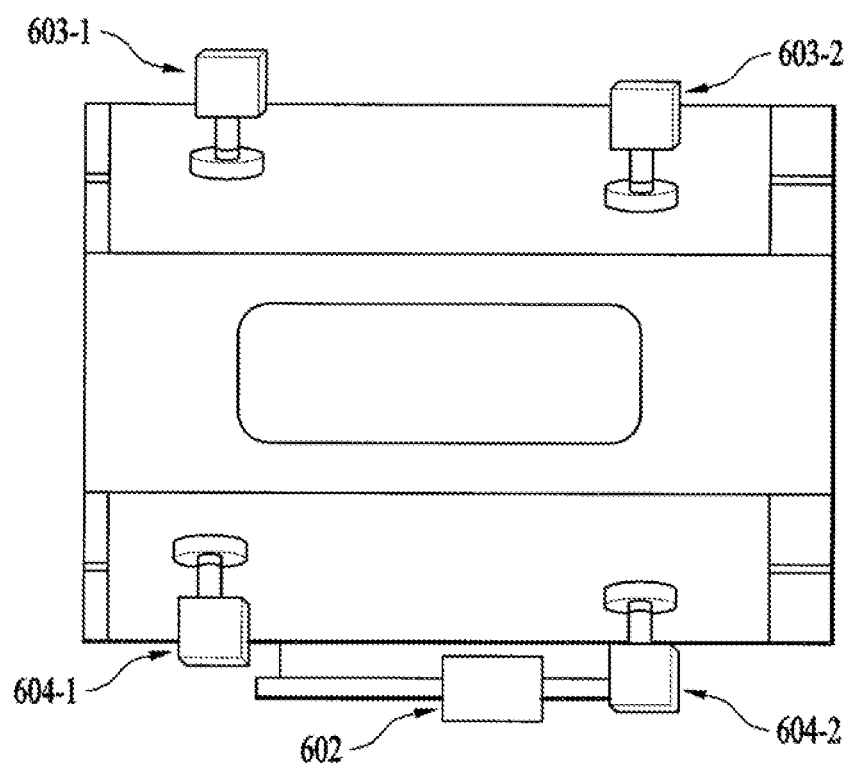
FIG. 7 is a view illustrating in detail the main body of the stereoscopic image display apparatus according to the embodiment of the present invention.

FIG. 7 is a view illustrating in detail the main body of the stereoscopic image display apparatus according to the embodiment of the present invention.

The remote-control alignment type reflecting members 603 and 604 shown in FIG. 6 may include reflecting members, such as mirrors, for reflecting the reflected beams toward the screen and motors for adjusting the directions of the reflecting members upward and downward and leftward and rightward in response to the second remote control signal. Specifically, in a case in which the stereoscopic image display apparatus is a triple beam system that splits image light emitted by a projector into a first reflected beam that is reflected upward and a second reflected beam that is reflected downward, the motors may include a motor 603-1 for adjusting the direction of the first reflected beam, which is reflected by the first remote-control alignment type reflecting member 603, upward and downward and a motor 603-2 for adjusting the direction of the first reflected beam leftward and rightward. In addition, the motors may further include a motor 604-1 for adjusting the direction of the second reflected beam, which is reflected by the second remote-control alignment type reflecting member 604, upward and downward and a motor 604-2 for adjusting the direction of the second reflected beam leftward and rightward.

The angle adjustment unit 602 will be described hereinafter in detail with reference to FIG. 8.

Figure 8:
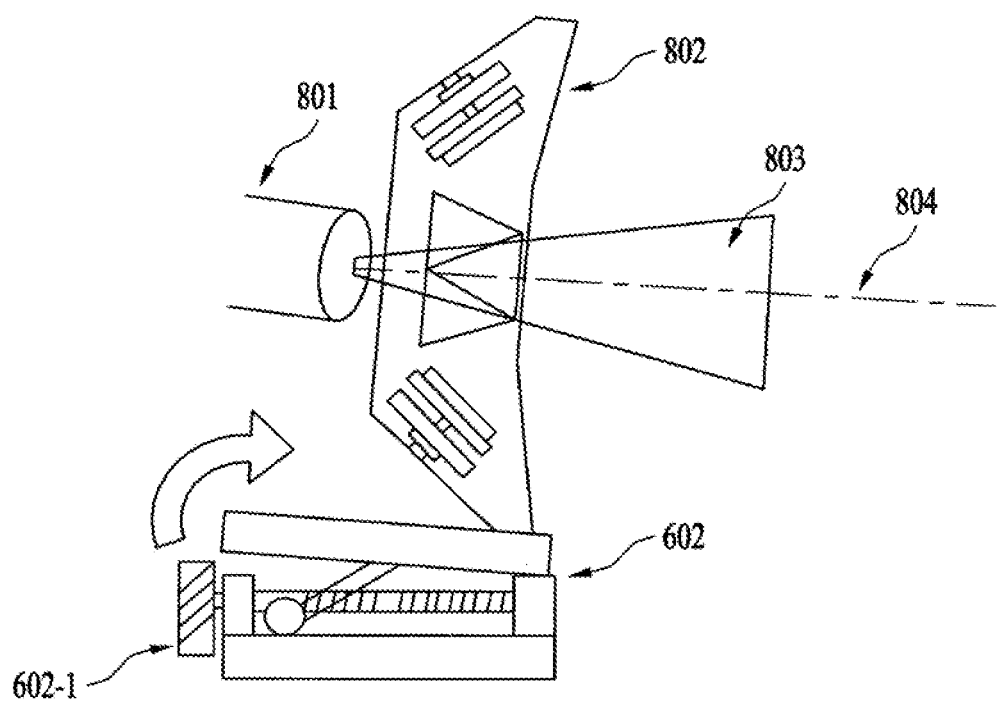
FIG. 8 is a view illustrating an angle adjustment unit according to an embodiment of the present invention.

FIG. 8 is a view illustrating an angle adjustment unit 602 according to an embodiment of the present invention.

As described above, the angle adjustment unit 602 is configured to adjust the angle of the transmitted beam, which has been split by the polarizing beam splitter. Alternatively, as shown in FIG. 8, the angle adjustment unit 602 may be configured to adjust the upward and downward angle of the main body, including the polarizing beam splitter, the modulators, and the remote-control alignment type reflecting members, of the stereoscopic image display apparatus in response to the first remote control signal. In this case, the angle adjustment unit 602 may be referred to as an apparatus angle adjustment unit 602.

The apparatus angle adjustment unit 602 may be configured to adjust the angle of the stereoscopic image display apparatus according to the rotation of an adjustor 602-1. However, the present invention is not limited thereto.

Specifically, the apparatus angle adjustment unit 602 may adjust an optical axis 804 of a beam 803 transmitted through a polarizing beam splitter 802 after being emitted from a lens 801 of a projector h that the optical axis 804 is aligned with the central axis of the polarizing beam splitter in a horizontal direction. In this embodiment, the apparatus angle adjustment unit 602 may adjust the angle of the main body of the stereoscopic image display apparatus in response to a control signal received from a remote controller that is connected to the main body of the stereoscopic image display apparatus in a wired or wireless fashion.

Figure 9:
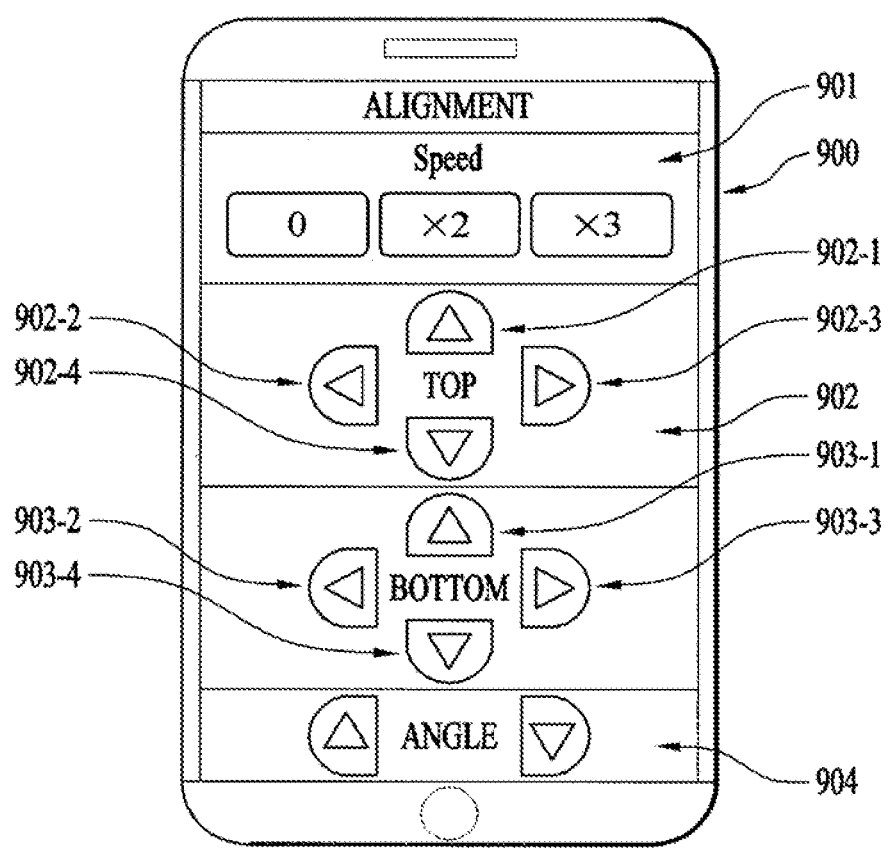
FIG. 9 is a view illustrating an example of a remote controller according to an embodiment of the present invention.

FIG. 9 is a view illustrating an example of a remote controller 900 according to an embodiment of the present invention. FIG. 9 shows a case in which the remote controller 900 is installed in a user's smartphone in the form of an application by way of example. However, the present invention is not limited thereto.

The remote controller 900 shown in FIG. 9 may include a speed control unit 901 for controlling a speed at which the angles of the reflecting members and the stereoscopic image display apparatus are adjusted. For example, as shown in FIG. 9, the speed at which the angles of the reflecting members and the stereoscopic image display apparatus are adjusted may be set to the minimum speed, double (X2) speed, or triple (X3) speed.

Meanwhile, in a case in which the stereoscopic image display apparatus is a triple beam system, the remote controller 900 may include an upper reflecting member control unit 902 for aligning the upper reflecting member, a lower reflecting member control unit 903 for aligning the lower reflecting member, and an angle adjustment control unit 904 for adjusting the angle of the stereoscopic image display apparatus.

The upper reflecting member control unit 902 may include switches 902-1, 902-2, 902-3, and 902-4 for adjusting the direction of the upper reflecting member upward, leftward, rightward, and downward. In addition, the lower reflecting member control unit 903 may include switches 903-1, 903-2, 903-3, and 903-4 for adjusting the direction of the lower reflecting member upward, leftward, rightward, and downward.

In a case in which the remote controller 900 described above is used, it is possible for a worker to align the stereoscopic image display apparatus in front of the screen without moving between the screen and the stereoscopic image display apparatus in order to align the stereoscopic image display apparatus. In addition, even in a case in which the stereoscopic image display apparatus is installed on the ceiling, it is possible for the worker to safely align the stereoscopic image display apparatus.

Figure 10:
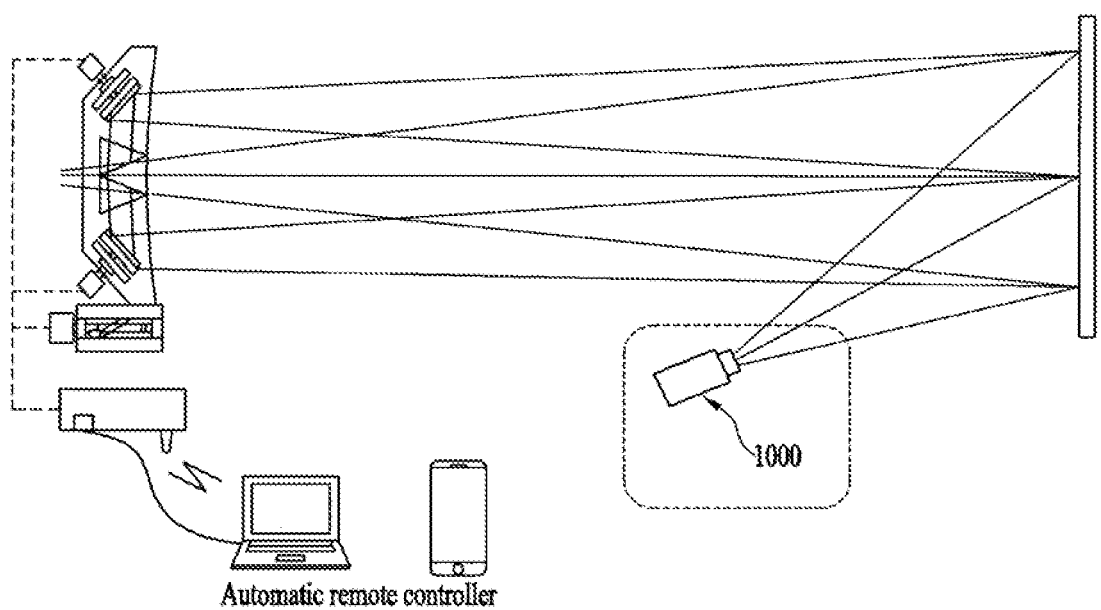
FIG. 10 is a view illustrating a method of automatically controlling a state of alignment of reflected beams with a transmitted beam in the stereoscopic image display apparatus in accordance with an embodiment of the present invention.

FIG. 10 is a view illustrating a method of automatically controlling a state of alignment of reflected beams with a transmitted beam in the stereoscopic image display apparatus in accordance with an embodiment of the present invention.

Specifically, the embodiment shown in FIG. 10 proposes that the stereoscopic image display apparatus further include a camera 1000 for checking a state of alignment of reflected beams with a transmitted beam. The camera 1000 may check a state of alignment of reflected beams with a transmitted beam from a captured image, and may transmit an alignment state checking signal to the driving unit. That is, in a case in which it is necessary to control a state of alignment of reflected beams with a transmitted beam, it is possible to use software to generate and use a control signal for adjusting the directions of the reflecting members and/or the angle of the stereoscopic image display apparatus based on the alignment state checking signal.

Figure 11:
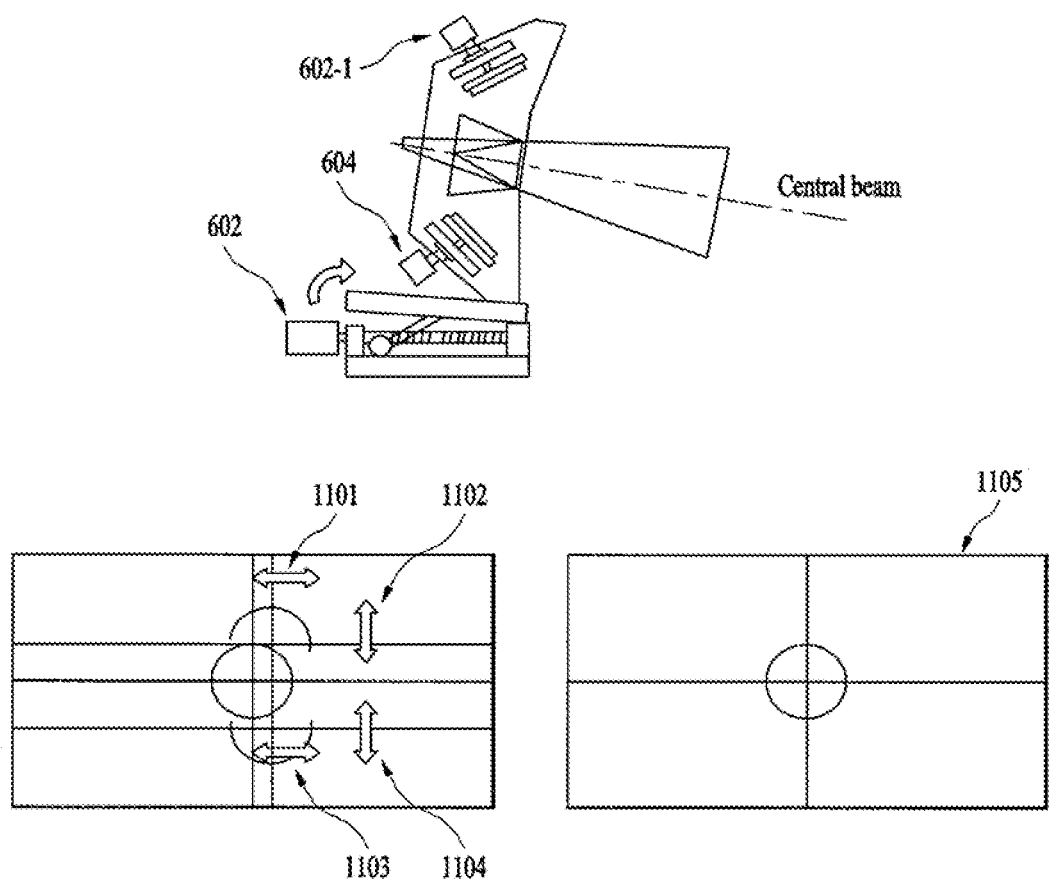
FIG. 11 is a view illustrating a method of automatically controlling a state of alignment of reflected beams with a transmitted beam using the construction of FIG. 10.

FIG. 11 is a view illustrating a method of automatically controlling a state of alignment of reflected beams with a transmitted beam using the construction of FIG. 10.

The lower part of FIG. 11 shows an image captured using the camera. The left side of the lower part of FIG. 11 shows a state in which the reflected beams are not aligned with the transmitted beam, and the right side of the lower part of FIG. 11 shows a state in which the reflected beams are aligned with the transmitted beam to form an image 1105. In a case in which the image is captured as shown in the left side of the lower part of FIG. 11, the remote controller may generate an alignment signal corresponding to the image captured by the camera, and may transmit the generated alignment signal to the driving unit. Specifically, the remote controller may generate signals for controlling the leftward and rightward directions 1101 and the upward and downward directions 1102 of the first reflected beam, and may transmit the generated signals to the first remote-control alignment type reflecting member through the driving unit. In addition, the remote controller may generate signals for controlling the leftward and rightward directions 1103 and the upward and downward directions 1104 of the second reflected beam, and may transmit the generated signals to the second remote-control alignment type reflecting member through the driving unit.

Meanwhile, the remote control signals described above may be generated using software installed in the camera, and may be transmitted to the remote controller or the driving unit.

Figure 12:
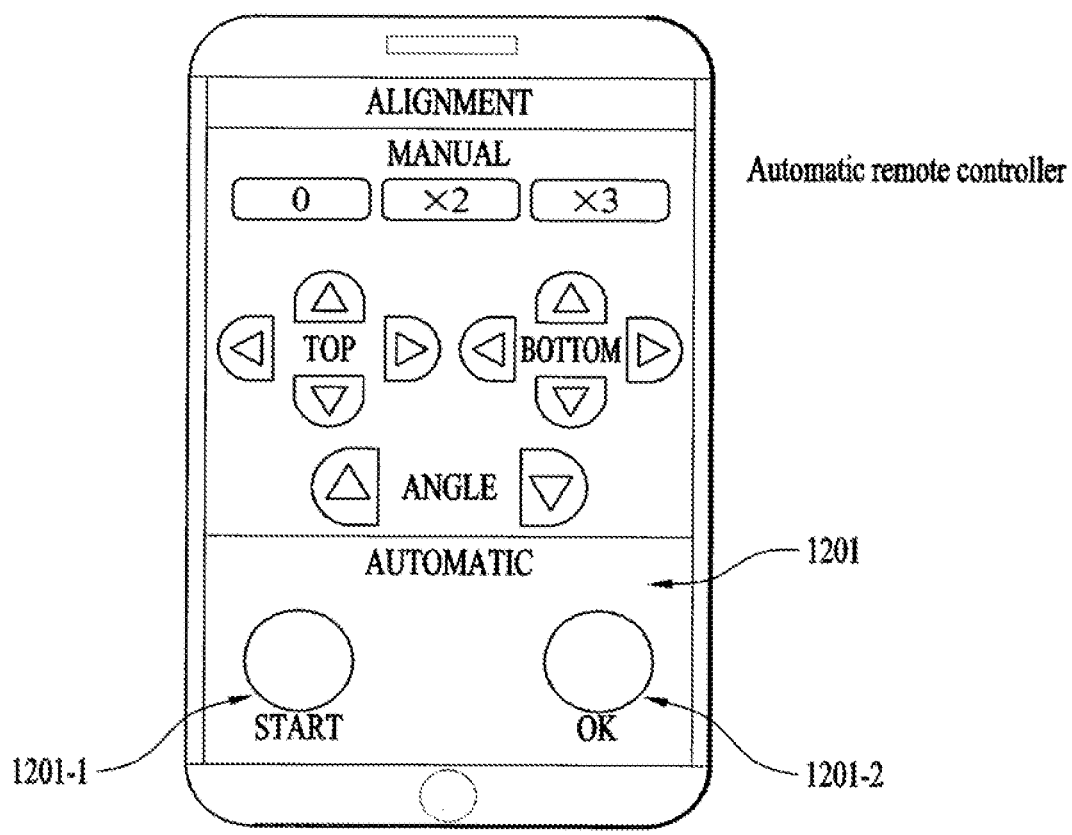
FIG. 12 is a view showing an example of a remote controller with an automatic alignment function according to an embodiment of the present invention.

FIG. 12 is a view showing an example of a remote controller with an automatic alignment function according to an embodiment of the present invention.

The remote controller shown in FIG. 12 is characterized in that it further includes a control unit 1201 for controlling an automatic alignment operation based on the state of alignment, checked using the camera as described above, or includes the control unit 1201 in place of the construction shown in FIG. 9, in contrast with the remote controller shown in FIG. 9.

When a start button 1201-1 for automatic alignment on the remote controller is pressed, the projector emits signal for alignment checking (e.g. a circular signal shown in FIG. 11), and the angles of the reflecting member(s) and the stereoscopic image display apparatus are adjusted based on the result of alignment checking using the camera. In addition, the remote controller may further include a button 1201-2 for allowing the worker to finish the automatic alignment when the worker completes alignment with the naked eye.

Figure 13:
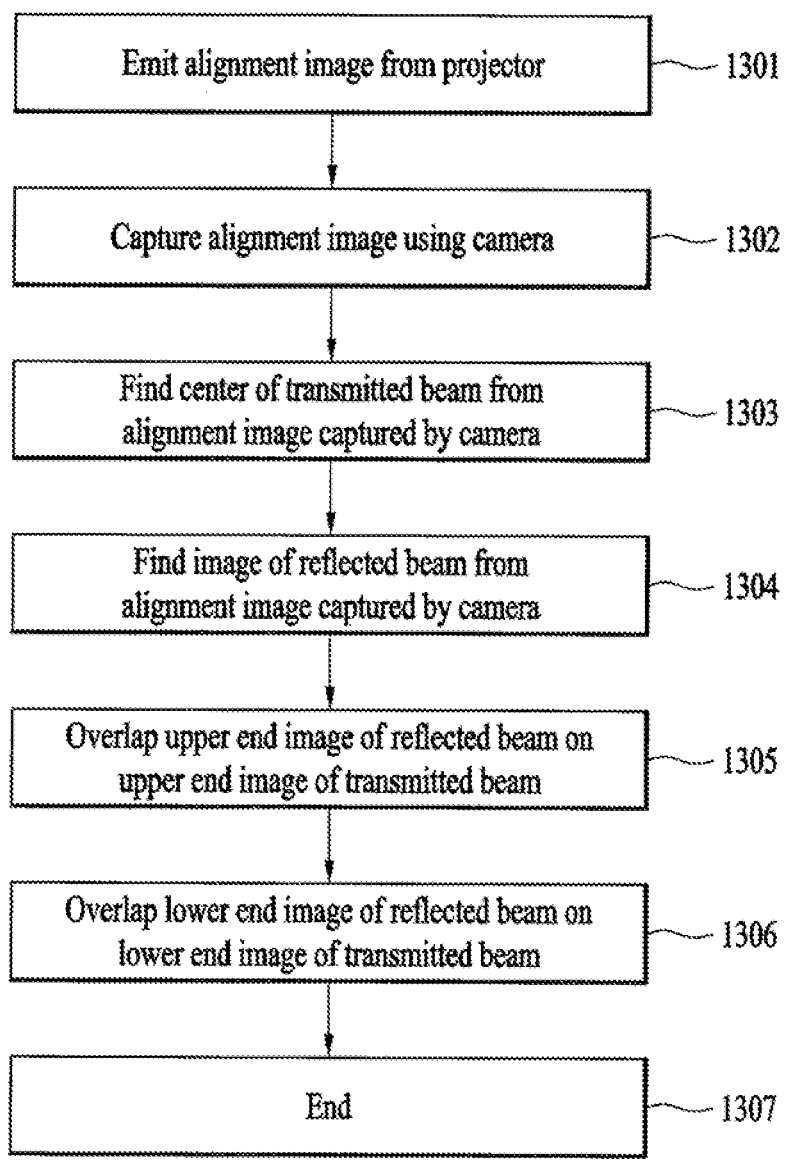
FIG. 13 is a flowchart illustrating an example of an automatic alignment method according to an embodiment of the present invention.

FIG. 13 is a flowchart illustrating an example of an automatic alignment method according to an embodiment of the present invention.

First, the projector may start to emit an alignment image in order to efficiently perform an automatic alignment function (1301). When the alignment image is emitted, the camera may capture an alignment image (1302), and the center of a transmitted beam may be found from the captured image (1303). Subsequently, an image corresponding to a reflected beam may be found from the alignment image captured by the camera (1304), and an upper end image of the reflected beam may be overlapped on an upper end image of the transmitted beam (1305). Subsequently, a lower end image of the reflected beam ay be overlapped on a lower end image of the transmitted beam (1306), As a result, the automatic alignment operation may be completed (1307).

Figure 14:
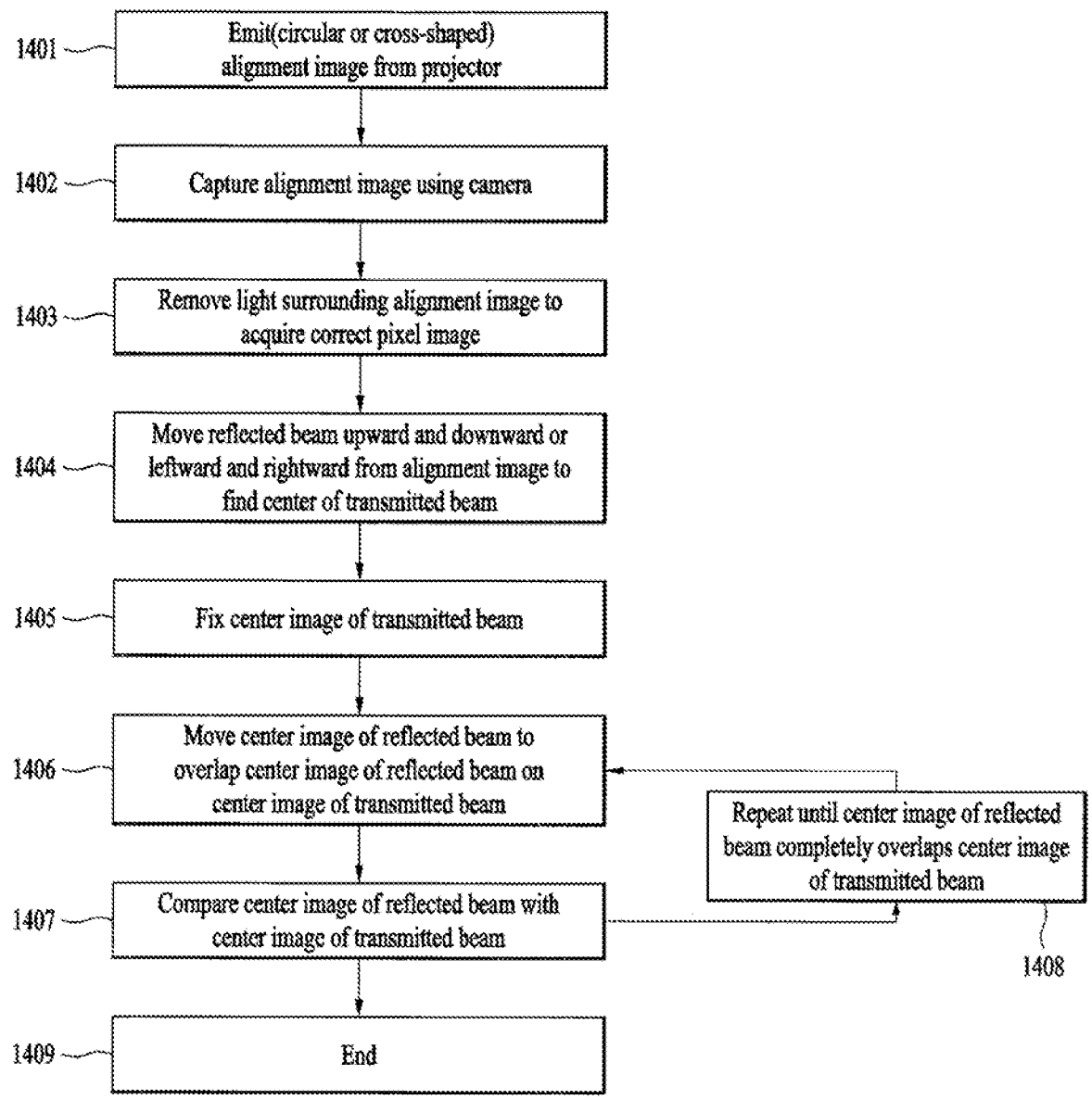
FIG. 14 is a flowchart illustrating an example of an automatic alignment method according to another embodiment of the present invention.

FIG. 14 is a flowchart illustrating an example of an automatic alignment method according to another embodiment of the present invention.

In the automatic alignment method shown in FIG. 14, the reflected beam is overlapped on the transmitted beam more precisely than in the automatic alignment method shown in FIG. 13. In the same manner as in FIG. 13, the projector may start to emit an alignment image in order to efficiently perform an automatic alignment function (1401). Here, the alignment image may be a circular alignment image or a cross-shaped alignment image.

When the alignment image is emitted, the camera may capture an alignment image (1402), and the center of a transmitted beam may be found from the captured image in the same manner as in FIG. 13 (1403 to 1405), in FIG. 14, however, in order to find the center of the transmitted beam more precisely, light surrounding the alignment image may be moved to acquire a correct pixel image (1403), a reflected beam may be moved upward and downward or leftward and rightward relative to the alignment image to find the center of the transmitted beam (1404), and a center image of the transmitted beam may be fixed (1405).

Meanwhile, although not shown in FIG. 14, the angle of the transmitted beam may be adjusted after finding the center of the transmitted beam or before finding the center of the transmitted beam.

Subsequently, a center image of the reflected beam may be moved to overlap the center image of the reflected beam on the center image of the transmitted beam (1406), and the center image of the reflected beam may be compared with the center image of the transmitted beam (1407). Steps 1406 and 1407 may be repeatedly carried out until the center image of the reflected beam completely overlaps the center image of the transmitted beam. As a result, the stereoscopic image may be accurately aligned (1409).

As is apparent from the above description, according to the embodiments of the present invention, it is possible to efficiently and safely align a reflected beam with a transmitted beam in a stereoscopic e display apparatus that displays a high-brightness stereoscopic image using a single projector.

The detailed description of the exemplary embodiments of the present invention has been given to enable those skilled in the art to implement and practice the invention. Although the invention has been described with reference to the exemplary embodiments those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:
1. A stereoscopic image display apparatus comprising:
 a polarizing beam splitter for spatially splitting image light into a transmitted beam and a reflected beam based on polarized components;

at least one modulator for adjusting the transmitted beam and the reflected beam such that the transmitted beam and the reflected beam have a first polarization state for a left image and a second polarization state for a right image;

an angle adjustment unit for adjusting a position of the transmitted beam after it is projected;

a remote-control alignment type reflecting member for adjusting a path of the reflected beam;

wherein the remote-control alignment type reflecting member is configured to be adjusted such that the reflected beam overlaps the projected transmitted beam.

2. The stereoscopic image display apparatus according to claim 1, wherein the remote-control alignment type reflecting member comprises:

a reflecting member for reflecting the reflected beam; and a first motor for adjusting a direction of the reflecting member upward and downward and a second motor for adjusting the direction of the reflecting member leftward and rightward in response to a second remote control signal.

3. The stereoscopic image display apparatus according to claim 2, wherein the second remote control signal controls the reflected beam to overlap the projected transmitted beam.

4. The stereoscopic image display apparatus according to claim 1, wherein the angle adjustment unit comprises a motor for adjusting an upward and downward angle of a main body of the stereoscopic image display apparatus in response to a first remote control signal, the main body comprising the polarizing beam splitter, the modulator, and the remote-control alignment type reflecting member.

5. The stereoscopic image display apparatus according to claim 4, further comprising a driving unit connected to the motors of the remote-control alignment type reflecting member for driving the motor of the remote-control alignment type reflecting member in response to the second remote control signal.

6. The stereoscopic image display apparatus according to claim 5, wherein the driving unit is further connected to the motor of the angle adjustment unit for driving the motor of the angle adjustment unit in response to the first remote control signal.

7. The stereoscopic image display apparatus according to claim 1, wherein the reflected beam is reflected downward to overlap the transmitted beam on a projection surface.

8. The stereoscopic image display apparatus according to claim 1, further comprising a camera for checking a state of alignment of the reflected beam with the transmitted beam.

9. The stereoscopic image display apparatus according to claim 8, further comprising a remote controller configured to transmit at least one selected from the first remote control signal and the second remote control signal based on an alignment state checking signal received from the camera.

10. The stereoscopic image display apparatus according to claim 9, wherein the remote controller comprises:

a first control unit for controlling a start or an end of an operation of transmitting at least one selected from the first remote control signal and the second remote control signal based on the alignment state checking signal; and a second control unit for controlling the operation of transmitting at least one selected from between the first remote control signal and the second remote control signal based on a worker's determination.

11. The stereoscopic image display apparatus according to claim 9, wherein the remote controller is installed in a mobile user device in a form of software.

12. A method of displaying a stereoscopic image comprising:

spatially splitting image light into a transmitted beam and a reflected beam based on polarized components;

adjusting the transmitted beam and the reflected beam such that the transmitted beam and the reflected beam have a first polarization state for left image light and a second polarization state for right image light;

adjusting a position of the transmitted beam after it is projected; and adjusting a path of the reflected beam such that the reflected beam overlaps the projected transmitted beam.

13. The method according to claim 12, wherein a first remote control signal controls the up and down position of the transmitted beam.

14. The method according to claim 12, wherein a second remote control signal controls the reflected beam to be overlapped with the transmitted beam.

15. A stereoscopic imaging apparatus comprising:

a polarization beam splitter configured to split image light into a transmitted beam and a reflected beam based on polarization;

at least one modulator configured to adjust the transmitted beam and the reflected beam such that the transmitted beam and the reflected beam have a first polarization state for a left image and a second polarization state for a right image;

a remote-control alignment type reflecting member configured to adjust a path of the reflected beam;

wherein the remote-control alignment type reflecting member is configured to be adjusted such that the reflected beam overlaps the transmitted beam.

16. The stereoscopic imaging apparatus according to claim 15, wherein the remote-control alignment type reflecting member comprises:

a reflecting member for reflecting the reflected beam; and a motor for adjusting a direction of the reflecting member upward and downward and leftward and rightward.

17. The stereoscopic imaging apparatus according to claim 16, further comprising a driving unit connected to the motor of the remote-control alignment type reflecting member for driving the motor of the remote-control alignment type reflecting member in response to a remote-control signal.

18. The stereoscopic imaging apparatus according to claim 15, wherein the remote-control alignment type reflecting member comprises:

a reflecting member for reflecting the reflected beam; and a first motor for adjusting a direction of the reflecting member upward and downward and a second motor for adjusting the direction of the reflecting member leftward and rightward.

19. The stereoscopic image display apparatus according to claim 15, further comprising a camera for checking a state of alignment of the reflected beam with the transmitted beam.

20. The stereoscopic image display apparatus according to claim 19, further comprising a remote controller configured to transmit the remote control signal based on an alignment state checking signal received from the camera.

* * * * *